United States Patent Office 3,152,704
Patented Oct. 13, 1964

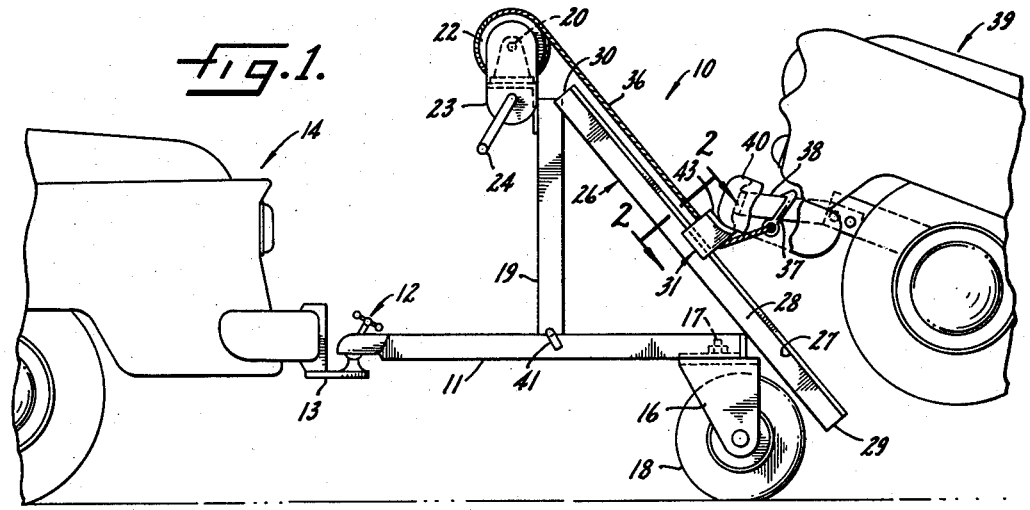
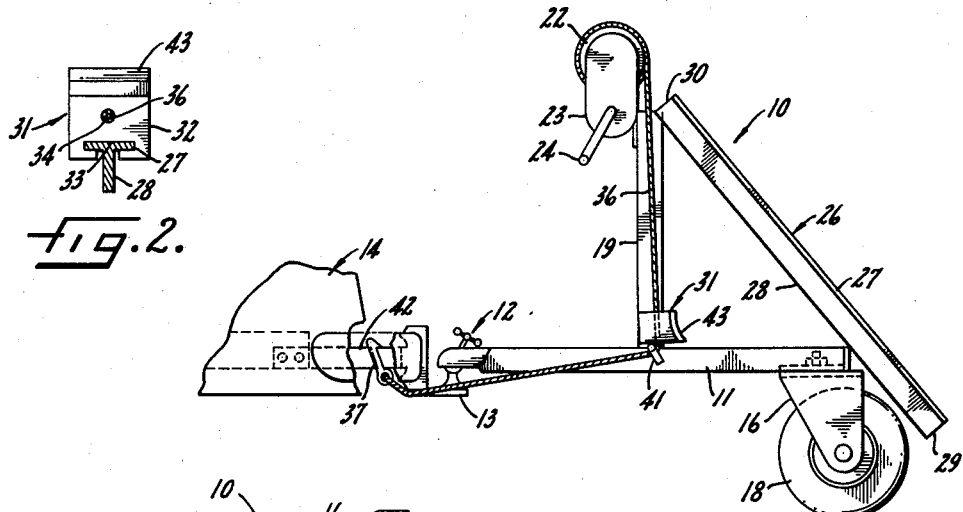
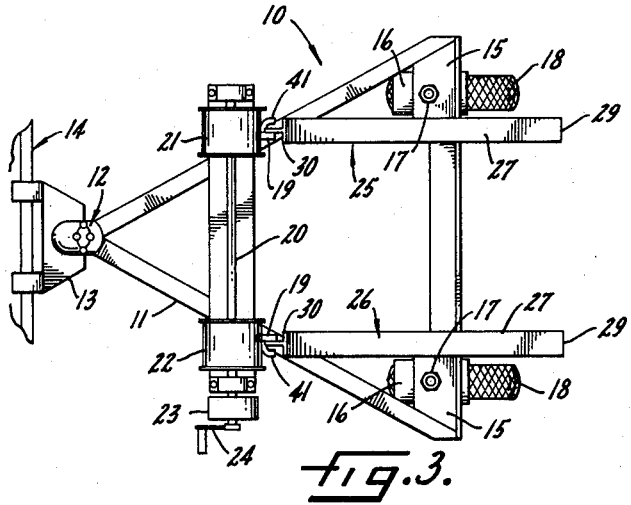

3,152,704
VEHICLE TOWING DEVICE
Arvin E. Russell, Camby, Ind., assignor to
Jack Allen Kesler, Indianapolis, Ind.
Filed Jan. 9, 1962, Ser. No. 165,154
4 Claims. (Cl. 214—86)

The present invention relates to a vehicle towing device, and is primarily concerned with the provision of light, inexpensive apparatus which may be used to facilitate the coupling of a disabled vehicle, such as a passenger automobile, to a towing vehicle which is not primarily designed for the task and which may be another conventional passenger automobile.

When an automobile is to be towed without an occupant, it is highly desirable that the dirigible wheels of the towed vehicle be elevated off the roadway; and vehicles which are designed for towing automobiles are conventionally provided with lift means for that purpose. Such towing equipment, however, is relatively expensive and is not always available, so that many occasions arise when it becomes desirable to tow an unoccupied vehicle behind a conventional passenger car. The rear end of such a conventional car should not be required to bear any substantial portion of the weight of the elevated front end of the towed vehicle. Means should be provided to prevent the towed vehicle from wandering and to control its direction if the hitched assembly is to be moved backward.

To meet these requirements, I have devised a wheeled dolly adapted to be connected to a towing vehicle through a conventional trailer hitch, and provided with means whereby the front end of a towed vehicle may be readily lifted and will be supported primarily upon the dolly wheels, and whereby the path of the towed vehicle will be effectively controlled whether the hitched assembly is moving forwardly or rearwardly. I have also provided means whereby the unloaded dolly may be towed behind a conventional automobile without wandering.

It may be said, then, that the objects of the present invention are to provide a device through which the above described requirements may be effectively satisfied, the device being sufficiently simple, light and inexpensive so that it may economically be owned by an organization which is required to perform towing services only infrequently and/or may be economically rented for individual towing jobs.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

FIG. 1 is a side elevation of a towing device constructed in accordance with the present invention, in operative relation between a towing vehicle and a towed vehicle, indicated fragmentarily;

FIG. 2 is an enlarged fragmentary section taken substantially on the line 2—2 of FIG. 1;

FIG. 3 is a plan view of the towing device with a fragment of the towing vehicle shown in association therewith; and FIG. 4 is a side elevation of the towing device illustrated in condition for unloaded towing behind a vehicle which is fragmentarily suggested.

Referring more particularly to the drawings, it will be seen that the reference numeral 10 indicates generally a dolly which comprises a substantially horizontal frame 11 provided, at its forward end, with conventional coupler means 12 which may be operatively connected to a conventional hitch 13 removably mounted upon the rear bumper of a conventional passenger automobile indicated by the reference numeral 14. The frame 11 includes laterally-projecting pads 15, 15, supported upon frames 16, 16 which are caster-swiveled as at 17, 17 to said pads, said frames 16, 16 providing journal mountings for wheels 18, 18.

Rigid braces 19, 19, are upstandingly mounted at opposite sides of the frame 11 substantially midway in the length of said frame, and a transverse shaft 20 is supported from said braces near the upper ends thereof, drum means 21, 22 being operatively connected to said shaft 20. Means is provided for rotating the shaft 20 to drive said drum means; and, in the illustrated embodiment of the invention, such driving means comprises a gear train indicated generally by the reference numeral 23 and adapted to be driven by a hand crank 24.

Two ramp rails 25 and 26 are supported upon the dolly 10, in downwardly and rearwardly inclined relation. Each ramp rail is T-shaped in cross section, comprising a flange 27 and a stem 28, and the flanges of the two rails are disposed in a common, rearwardly and upwardly facing plane. As is clearly to be seen in the drawings, the rearward lower ends 29 of the ramp rails are located below and to the rear of the frame 11, and the upper ends 30 of said rails are unobstructed, as to the flanges 27 thereof, for a reason which will appear.

A slide, carriage or guide member 31 is provided for each of the ramp rails. Each such guide member comprises a block 32 formed in its base with a T-slot 33 proportioned and designed to receive the flange 27 of a ramp rail and freely to pass the stem 28 of said rail. Thus, each guide member 31 may be so mounted on a rail 25 or 26 as to be freely movable longitudinally of the rail but to be restrained against movement in any other direction relative to the rail. Each guide member is further formed with a guide passage 34 therein extending parallel with the length of its slot 33. That surface of each guide member 31 remote from the slot 33 is generally upwardly-presented, is formed to a curve, as is most clearly illustrated in FIG. 1, and preferably carries a yieldable pad 43 of some material such as rubber, polyurethane foam or the like.

A cable 36 is provided for each ramp rail, each such cable having one end trained over, and operatively connected to, a drum 21 or 22, each cable being threaded through the guide passage 34 of one of the guide elements 31, and each cable carrying, at its opposite end, a hook 37 or other suitable connector means for attachment to a vehicle to be towed. For instance, if the connector means is a hook like that illustrated at 37, each such hook may be engaged with one brace 38 for the bumper 40 of such a vehicle, indicated by the reference numeral 39. The parts are so proportioned and designed that, when the vehicle to be towed is standing normally on a road surface, its front bumper 40 will be somewhat above the lower ends 29 of the ramp rails 25 and 26. The dolly 10, suitably hitched to the vehicle 14, will be brought close to the front end of the vehicle 39 and substantially in alignment therewith, the carriages or guide elements 31 will be moved to positions near the lower ends 29 of the rails 25 and 26, the cables 36 will be drawn outwardly away from the dolly, and the hooks 37 will be engaged with the bumper braces 38 of the vehicle 39. Now, by manipulation of the crank 24, the cables will be retracted. Thus, the vehicle 39 will be moved forward toward the dolly 10 until its bumper 40 engages the pads 43 on the upwardly-presented surfaces of the guide elements 31. During such movement, adjustment of the guide elements 31 may be effected, if necessary, so that the bumper 40 of the vehicle 39 will engage the two guide elements squarely and equally. During this operation, the cables 36 will slide freely through the guide passages 34 of the elements 31.

Once the bumper engages the guide elements 31, however, further movement of the cables 36 through the guide passages will, of course, be prevented; and further manipulation of the crank 24 in the same direction will cause the guide elements 31 to slide upwardly and forwardly along the rails 25 and 26, supporting and carrying with them the bumper 40, and therefore the front end, of the vehicle 39. Operation of the crank is continued until the bumper 40 of the vehicle 39 has been moved into, or perhaps slightly forwardly beyond, the vertical plane which includes the axles of the wheels 18. Thus the forward end of the vehicle 39 is raised to lift its dirigible wheels off the roadway, and the weight of the lifted vehicle end is supported almost, if not quite, solely upon the wheels 18, very little weight being transmitted to the towing vehicle 14.

Suitable means (not shown) is provided for locking the drums 21 and 22 in adjusted position to retain the guide elements 31, and so the forward end of the vehicle 39, in the position of FIG. 1. For instance, the crank 24 may carry the worm of a worm-and-pinion gear train, in which case, of course, the gear train will be inherently irreversible.

With the parts in the condition of FIG. 1, the dolly 10 and the vehicle 39 are, in effect, locked together as a single unit to follow the vehicle 14, hinging only about the axis of the trailer hitch 12–13. The rear wheels of the vehicle 39 will restrain the dolly 10 against wandering upon its caster wheels 18, yet the caster mounting of those wheels will permit the effectively rigid assembly of dolly and towed vehicle to hinge freely about the axis of the hitch as the towing vehicle changes direction. When the connected assembly is moved backwardly, the dolly 10 and vehicle 39 will still act like a single, rigid unit, and thereby its direction can be controlled without difficulty.

It will be clear that, because of the caster mounting of the wheels 18, the dolly 10 might "fishtail" badly when traveling in unloaded condition unless preventive means were provided. As has been said, the flanges 27 of the ramp rails 25 and 26 are unobstructed at the upper ends 30 of said rails. Thus, when the dolly is to travel in unloaded condition, the guide elements 31 may be removed from the rails 25 and 26 by sliding them off the upper ends of the rails. At each side, the frame 11 carries a laterally-projecting guide hook or abutment 41 near the base of the adjacent upright 19. When the guide elements 31 have been so removed from the ramp rails, the cables 36 may be drawn directly downwardly from the drums 21 and 22, may be engaged beneath the hooks 41 and then may be led forwardly until the hooks 37 may be engaged with the rear bumper braces 42 of the towing vehicle 14 in the manner illustrated in FIG. 4. The guide elements 31 remain, of course, threaded upon the respective cables; and preferably those guide elements will rest upon the hooks 41 in the manner illustrated in FIG. 4. If the crank 24 is now manipulated to draw the cables 36 taut, the dolly 10 will thereby be locked quite rigidly in alignment with the vehicle 14 so that it cannot swing about the axis of the hitch 12–13.

I claim as my invention:

1. A towing dolly comprising a wheeled frame, coupler means for connection to a towing vehicle, ramp means fixedly carried by said frame and inclined downward and away from said coupler means, take-up means carried by said frame, carriage means mounted to travel said ramp means and formed to provide a generally upwardly-presented supporting surface proportioned and arranged to engage supportingly beneath the bumper of an automobile, flexible connector means guided for movement with said carriage means and, longitudinally of said ramp means, relative to said carriage means, one end of said connector means being operatively connected to said take-up means, and means carried at the other end of said connector means for connection to an upwardly-presented surface of a vehicle to be towed, whereby tension on said connector means urges said bumper downwardly against said carriage surface.

2. A towing dolly comprising a wheeled frame, coupler means for connection to a towing vehicle, a pair of laterally-spaced, coplanar ramp rails carried by said frame, facing away from said coupler means, extending from a level below the normal level of a passenger automobile bumper and inclining upwardly and toward said coupler means to a level significantly above the normal level of a passenger automobile bumper, a carriage slidably mounted on each ramp rail and formed to provide a generally upwardly-presented supporting surface proportioned and arranged to engage supportingly beneath the bumper of an automobile, drum means mounted on said frame adjacent the upper ends of said rails, a pair of cables, each cable being trained over said drum means and slidably penetrating one of said carriages at a level below said supporting surface, means carried by each cable at a point more remote than its carriage from said drum means for connection, at a level above said supporting surface, to a vehicle to be towed, and means for rotating said drum means to retract said cables.

3. A towing dolly comprising a generally horizontal frame provided at its forward end with coupler means for connection to a towing vehicle, wheels supporting the rear end of said frame and mounted to swivel individually about transversely-spaced axes on said frame, upstanding brace means supported intermediately of said frame, two laterally-spaced ramp rails having their rear ends disposed below and behind said frame and having their front ends disposed near the top of said brace means, the rearwardly- and upwardly-facing surfaces of said rails being disposed substantially in a common plane, drum means supported near the top of said brace means, a carriage slidably mounted on each ramp rail for movement longitudinally therealong but restrained against transverse movement relative thereto, each carriage being formed to provide a generally upwardly-presented supporting surface proportioned and arranged to engage supportingly beneath the bumper of an automobile and further being formed with a guide passage therein at a level below said supporting surface, a cable for each ramp rail, each cable being trained over said drum means and extending through the guide passage of one of said carriages, connector means carried by each cable at a point more remote from said drum means than is the associated carriage, and means operable to retract said cables simultaneously to draw said connector means toward said drum means.

4. A towing dolly comprising a wheeled frame, coupler means for connection to a towing vehicle, upstanding brace means supported from said frame, two laterally-spaced ramp rails having their forward ends supported near the top of said brace means and their rearward ends disposed below and behind said frame, a carriage retainingly mounted on each rail for free sliding movement longitudinally of its rail, the upper end of each rail being unobstructed to free its carriage for removal from said upper rail end, each carriage being formed with a guide passage therein, a cable for each ramp rail and extending through the guide passage of one of said carriages, connector means carried by each cable adjacent one end, means operatively connected to each cable adjacent the other end thereof and operable to move said cable upwardly along its associated rail, and abutment means carried at each lateral side of said frame, each abutment means being positioned to support one of said carriages when the latter is detached from said rail and to guide the first-named end of the corresponding cable for connection of the connector thereof to the towing vehicle.

References Cited in the file of this patent

UNITED STATES PATENTS

| | | |
|---|---|---|
| 365,332 | Craig | June 21, 1887 |
| 1,342,826 | Schmiederer | June 8, 1920 |
| 1,734,373 | Grimm | Nov. 5, 1929 |
| 2,414,447 | Cargile | Jan. 21, 1947 |
| 2,628,733 | Hale | Feb. 17, 1953 |